Figure 1:
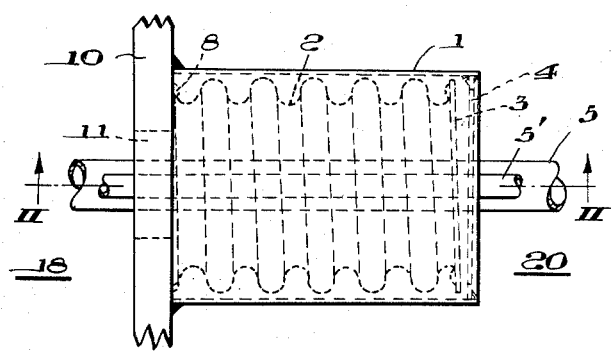

Jan. 29, 1957 P. PORTNEY ET AL 2,779,609
FLEXIBLE SEAL FOR PIPES PASSING THROUGH A WALL
Filed March 4, 1953

INVENTORS.
PHILLIP PORTNEY,
CARL E. VANCURA
BY
Walter J. Monacelli
their
ATTORNEY

United States Patent Office 2,779,609
Patented Jan. 29, 1957

2,779,609

FLEXIBLE SEAL FOR PIPES PASSING THROUGH A WALL

Phillip Portney, Chicago, and Carl E. Vancura, La Grange Park, Ill., assignors to Koppers Company, Inc., a corporation of Delaware Application March 4, 1953, Serial No. 340,326

2 Claims. (Cl. 285—45)

The present invention relates to a flexible seal and more specifically to a flexible seal designed to permit piping or conduit to pass in a leakproof arrangement through a wall or partition separating two rooms or chambers.

In chemical, gas and other industries, it is frequently desirable to isolate inflammable or toxic gasses in a selected area and to prevent circulation of air at points where piping or conduits enter or leave such an area. To accomplish this it is desirable that the sealed portion between the pipes and the walls of the selected area to which the pipes lead be shielded as far as possible from the surrounding circulating air. Furthermore, it is desirable that such a sealed portion be protected from damage due to expansion or contraction of the pipe or conduit passing through the seal.

Moreover, it is desirable in installations where piping connections must be carried through vessels having two or more concentric walls and the temperature conditions in the pipe are substantially different from those inside the vessel through which the pipe is carried, to provide a piping connection which is free to move due to expansion or contraction of the pipe yet will not be damaged by such movement.

To meet these industrial requirements, numerous seals have been provided which are complex in design, requiring expensive and complicated packing members, which are difficult to install and maintain and which fail to compensate for the expansion and contraction of the pipe due to temperature changes.

The present invention assures a sealed condition between pipes or conduits and the wall to which they are connected regardless of pipe movement due to expansion and contraction and, further, provides a straight-forward design that is economical and easy to install and maintain.

More particularly the present invention provides a flexible seal for piping to be passed through a wall opening of a chamber comprising a flexible sleeve disposed within the chamber and fluid-tightly fixed at one end to the face of said wall surrounding the periphery of said wall opening, at least one pipe adapted to pass freely through said wall opening and through said sleeve fixed thereto and means fluid-tightly closing the other end of said flexible sleeve around said pipe, sealing that portion of the pipe passing through the bellows from the chamber.

According to another feature of the invention, the flexible sleeve comprises a corrugated cylindrical bellows which may readily expand and contract in accordance with any expansion and contraction of the pipe passing therethrough and which is adapted to free lateral movement.

According to another feature of the invention the bellows is welded at one end to the wall face and is provided with a sealing plate at the other end which is welded or soldered to the bellows and which plate has as many openings therethrough as there are conduits, the welded joints providing a straightforward and economical means for fluid-tight sealing.

According to still another feature of the invention the pipes passing through the openings in the seal plate are welded thereto to provide a fluid-tight sealing joint which is more straightforward and less complex than the packing arrangements heretofore known.

According to still another feature a protecting cylindrical guard is provided around the bellows with an open end plate attached thereto which guard and plate prevent excessive extension, compression or lateral movement of the bellows, thus protecting the bellows from possible damage from over-travel in any direction.

According to still another feature of the invention pipe spacers are provided to keep the pipes in substantially parallel relationship with each other, preventing the pipes from excessive individual twisting which would result in breakage of the fluid-tight joint between the pipes and seal plate openings.

According to still another feature of the invention, a sealing arrangement is provided which permits an easy and straightforward adaptation of tracer pipe wherever necessary.

It is obvious that various changes can be made by one skilled in the art in the arrangement, form, construction and type of the various elements disclosed without departing from the scope or spirit of this invention. Thus, for example, when a plurality of pipes are used a spacer plate may be used in place of the pipe spacers shown to keep the pipes properly aligned.

Reference will now be made to the accompanying drawing which illustrates and exemplifies the embodiment of the apparatus of the invention in a preferred type of construction.

Figure 1 discloses a plan view of the flexible seal for piping.

Figure 2:
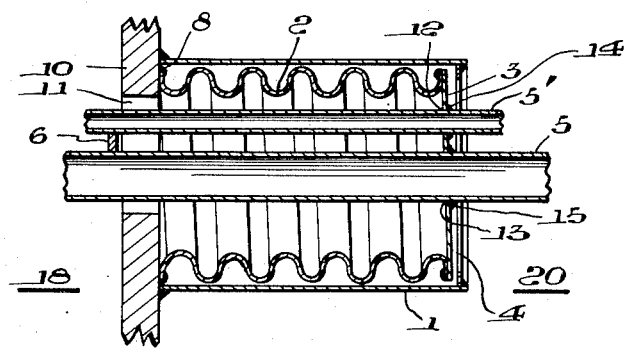
Figure 3:
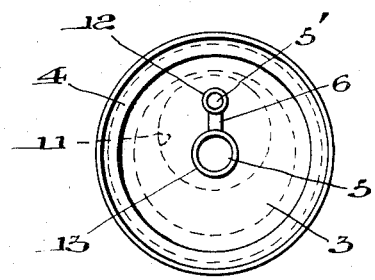

Figure 2 discloses a sectional view taken through the line II—II thereof, and Figure 3 discloses an end view.

In accordance with the drawing the reference numeral 10 indicates generally a wall or partition separating two rooms or chambers indicated generally by reference numerals 18 and 20, the wall having a passageway 11 therethrough. Welded or soldered to the face of the wall surrounding the periphery of the passageway 11, to form fluid-tight joint 8, is a flexible metallic sleeve 2. This sleeve may be a corrugated cylindrical bellows and in the preferred disclosure has a length approximately equal to the diameter which diameter is greater than the diameter of the passageway, the dimensions being variable in accordance with desired design.

Welded or soldered to the opposite end of the bellows is a flat plate 3 having openings 12 and 13 therein which are of sufficient diameters to snugly accommodate the pipes 5 and 5' which are passed therethrough, the pipe 5' serving as a tracer line for steam for the purpose of communicating heat to pipe 5. These pipes are soldered or welded to the plate 3 to form fluid-tight joints 14 and 15. This seals the bellows, preventing the passage of fluid from one chamber to the other and yet due to the flexible corrugated cylindrical bellows which is easily extensible or compressible and also capable of some lateral displacement, the expansion, contraction or lateral movement of the pipe or conduits does not break the seal between the two chambers.

A pipe spacer 6 is provided between the pipes, 5 and 5'. This spacer helps to maintain the pipes in substantially parallel alignment and prevents the pipes from individually bending at passages 12 and 13, which bending might break the fluid-tight joints 14 and 15. It is obvious that any desired number of pipes and corresponding openings may be provided. Although the spacers aid in preventing bending of the pipes, it will be realized that spacers may be eliminated when so desired without affecting the primary operation of the flexible seal.

Welded to the wall 10, and enclosing the bellows 2 is the end of a cylindrical guard 1. This cylindrical guard 1 has an end plate 4 welded or soldered to its free end and the end plate has an opening therein slightly smaller than the diameter of the bellows 2. The protecting cylindrical guard 1 with its end plate 4 prevents excessive extension, compression or lateral movement of the bellows, thus protecting the bellows from possible damage from overtravel in any direction. Although the guard 1 performs the desired function of protecting the pipe and limiting bellows movement it will be realized the guard may be eliminated when so desired without affecting the primary operation of the flexible seal.

While the description and drawings illustrate particular embodiments of the invention, various modifications within the language of the description and claims are intended to be claimed herein.

The invention claimed is:

1. A partition for separating two chambers one of which houses toxic and inflammable gases comprising a metallic wall having an opening therein, a plurality of gas conduits floatingly extending through said opening, said conduits being smaller than said opening so as to be floatingly mounted relative said opening, metallic bellows surrounding at least a portion of said plurality of gas conduits in said toxic chamber, said bellows having its longitudinal axis positioned substantially at a right angle to said metallic wall and having one end welded to said wall around said opening to be in direct communication with said opening, a seal plate welded in fluid-tight engagement with the other end of said bellows and removed from said wall, said seal plate having a plurality of apertures therein corresponding in number to the number of gas conduits, said conduits passing through said apertures in welded fluid-tight engagement with said seal plate, spacers positioned between said conduits to maintain said conduits in substantially parallel relation with respect to each other, and a cylindrical guard sleeve disposed within said toxic and inflammable gas chamber and surrounding said metallic bellows, one end of said guard sleeve being welded to said wall, and means on said sleeve for allowing limited lateral movement of said bellows.

2. The apparatus of claim 1 wherein said means on said guard sleeve for allowing limited lateral movement comprises an annular end plate welded to the free end of said sleeve to provide an abutment for said seal plate when said bellows expands thereby limiting longitudinal movement of said bellows within said toxic and inflammable chamber.

References Cited in the file of this patent

UNITED STATES PATENTS

| | | |
|---|---|---|
| 1,830,060 | Holbrook | Nov. 3, 1931 |
| 2,014,355 | Hussman | Sept. 10, 1935 |
| 2,185,450 | Wager | Jan. 2, 1940 |
| 2,506,293 | Copeland | May 2, 1950 |
| 2,520,751 | Zucrow | Aug. 29, 1950 |